Aug. 14, 1923.
H. N. WAYNE
1,464,632
PROCESS OF EMBEDDING CORDS IN RUBBER
Filed April 15, 1918
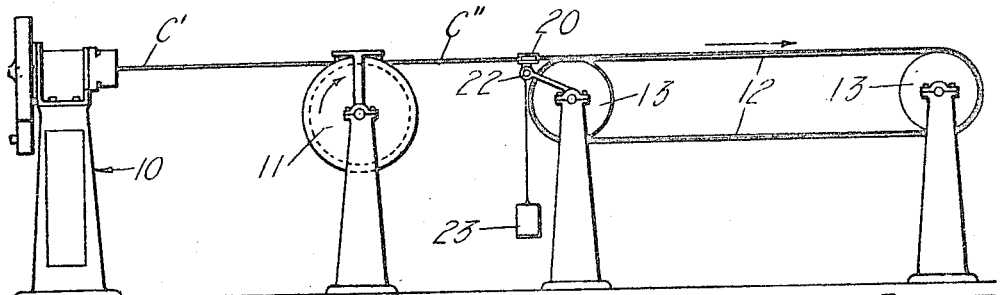
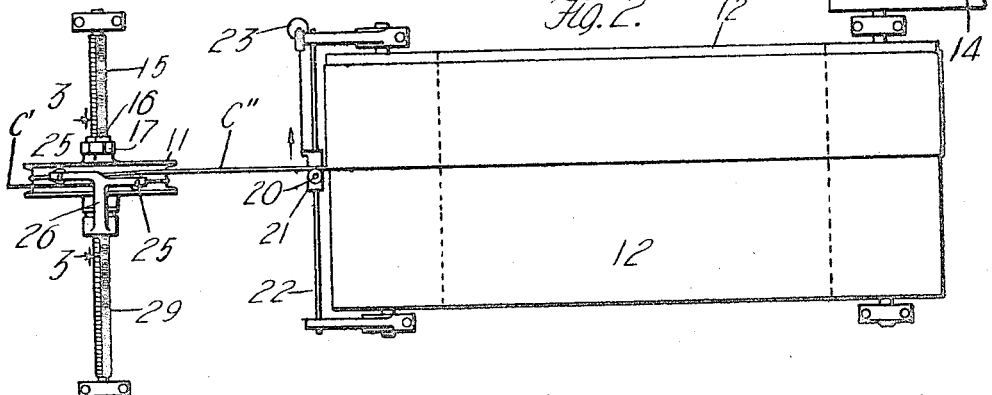
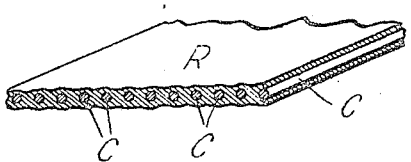
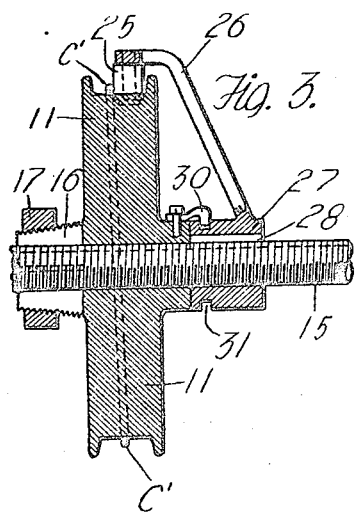
Inventor
Herbert N. Wayne
by James T. [signature]
his Attorney Patented Aug. 14, 1923.

1,464,632

UNITED STATES PATENT OFFICE.

HERBERT N. WAYNE, OF LOS ANGELES, CALIFORNIA.

PROCESS OF EMBEDDING CORDS IN RUBBER.

Application filed April 15, 1918. Serial No. 228,691.

*To all whom it may concern:*

Be it known that I, HERBERT N. WAYNE, a citizen of the United States, residing at Los Angeles, in the county of Los Angeles, State of California, have invented new and useful Improvements in Processes of Embedding Cords in Rubber, of which the following is a specification.

This invention relates to processes for embedding cords in rubber, or for forming corded rubber sheets and the like; and the object of the invention is to provide a simple and efficient means of embedding cords in rubber, and specifically, of forming a corded rubber sheet or the like.

The process has as its basis the coating with a rubber or other plastic compound of a fibrous cord under very high pressure thereby forcing the compound into the fibers of the cord to insure perfect impregnation and then laying lengths of this impregnated cord alongside each other while the coating is still plastic and in a condition to unite and coalesce to form a single body or sheet of parallel cords embedded in rubber.

The process is preferably carried on continuously, with the second step following immediately after the first step, so that the lengths of coated cords are laid alongside each other while the rubber compound is still fresh and warm from the machine which performs the coating operation.

Wherein in these specifications or claims the term "rubber" is used it means rubber mixed or compounded with ingredients suitable for the purpose intended.

The process will now be best understood from the following description of a preferred specific form thereof, reference for this purpose being had to the accompanying drawings in which—

Fig. 1 shows a side elevation of an apparatus adapted to perform the process; Fig. 2 is a plan thereof; Fig. 3 is an enlarged detail section taken on line 3—3 of Fig. 2; Fig. 4 is a view illustrating the condition of the cord as it comes from the coating machine; and Fig. 5 is a view illustrating the form of the finished article.

In the drawings I show a machine at 10 which is in the nature of such machines as are commonly used for coating electric wires with a covering of rubber. I pass a cord through such a machine as this which forces the plastic rubber into and around the cord under great pressure and in quantity and thickness of rubber desired. I prefer to make this coating as thin as possible, consistent with the results wished to be obtained; and it may be an object in this step of the process to have as much of the rubber pass into and impregnate the cord as is practicable. The coated cord emerges from machine 10 as indicated at C', and passes onto a tension sheave 11, passing once around that sheave and then passing on at C" onto a belt or apron 12, or any other suitable winding means by means of which successive lengths of the cord may be laid alongside each other. I prefer to use a belt 12 running over spaced drums 13; and means may be provided at 14 for driving one of the drums at suitable speed. I herein explain mechanism for winding only one cord at a time; but it will be readily understood that two or more cords may be run together, side by side, onto the winding belt or drum.

The tension sheave 11 also forms a guide for the coated cord. This sheave is internally screw-threaded and runs on the horizontal screw-threaded shaft 15, the threads being of such a pitch as to advance the sheave 11 across on the shaft 15 at just the proper speed to feed the cord C" laterally across the belt 12 to wind the cord in a single layer upon the belt. In order to provide a proper tension, the sheave 11 may be provided with a friction means which may include a split hub 16 having a tapering screw-threaded interior with a nut 17 thereon, so that by adjusting the nut the amount of friction on shaft 15 may be adjusted.

To keep the successive convolutions of the coated cord up against each other, I may use a small pulley or roller 20 mounted on a slider 21 sliding on a transverse rod 22 and pulled over in a direction indicated in Fig. 2 by a suitable weight 23. This weight pulls the pulley over in the direction indicated and keeps the coated cord up laterally against the last convolution laid, so as to keep a good contact between all the succeeding convolutions of the coated cord. When these successive lengths of the coated cord are brought into contact with each other, the rubber, which is still fresh, warm, and plastic, adheres and may unite or coalesce, or partially unite or coalesce; so that the cross section of the finished article is somewhat as shown in Fig. 5. Unification or coalescence will take place completely during subsequent process of vulcanization. The cord C is thus embedded in lengths in parallel relation in a sheet of rubber R whose surfaces may be more or less smooth and flat or more or less ribbed, depending on just how the rubber coatings have coalesced. When a complete annular band of the finished product has thus been made, it may be removed and cut up into sheets or used in any other manner desired. For certain uses, as for endless belting, deckle straps, printing blankets, etc., the continuous band will be left in its form herein described. For other uses, as tire fabric for producing cord tires, steam and cold water packings, and other uses which are not necessary here to describe, the completed annular band will be cut up into sheets of suitable form and size.

Although the fresh warm rubber will adhere together when it comes into contact with itself, it does not adhere to any smooth cool surface. In order to keep the rubber coating from rubbing against itself in passing over the tension sheave 11, I provide a pair of rollers 25 above the tension sheave. The incoming cord passes on one side of one of these rollers, while the outgoing cord passes on the other side of the other roller, thus spreading the two parts of the coated cord apart at the top of the sheave where they would be otherwise liable to rub against each other. The roller 25 may be mounted upon a bracket 26 supported from a hub 27 mounted on shaft 15 to slide thereon. Shaft 15 is held stationary and hub 27 has a key 28 sliding in a key-way 29 to prevent the hub from revolving. The hub 27, and with it the rollers 25, are moved longitudinally of shaft 15 by means of a lug 30 mounted on the hub of tension sheave 11 and projecting into a circumferential groove 31 in hub 27.

While it will be understood that I have described a form of machinery which is suitable to the carrying out of my process, I do not limit my process to be carried out by such mechanism, neither do I limit the process itself to the particular and specific details herein described, except as is stated in the following claims.

Having described a preferred form of my invention, I claim:

1. The herein described method of embedding cords in rubber, comprising first continuously coating a cord with unvulcanized rubber in tubular form so that the cord is continuously enclosed in a tubing of unvulcanized rubber, and then forming a sheet of elastic fabric therefrom by them immediately and continuously laying successive lengths of the coated cord alongside each other while the rubber is fresh, thereby to allow the rubber coatings of the cord lengths to adhere to form a sheet.

2. The herein described method of embedding cords in rubber, comprising first continuously coating a cord with unvulcanized rubber in tubular form so that the cord is continuously enclosed in a tubing of unvulcanized rubber, and then forming a sheet of elastic fabric therefrom by then immediately and continuously laying successive lengths of the coated cord alongside each other while the rubber is fresh, thereby to allow the rubber coatings of the cord lengths to adhere to form a sheet, maintaining on the length being laid a continuous lateral pressure tending to force that length over laterally against the adjacent length previously laid.

3. The method of making rubberized cord fabric which consists in coating the cord with hot plastic rubber, and then assembling a series of the coated strands in cohesive relation to form a web.

4. The method of making rubberized cord fabric which consists in surrounding the individual strands with rubber rendered plastic by heat, and assembling a series of the warm coated strands coherently in the form of a web.

In witness that I claim the foregoing I have hereunto subscribed my name this 5th day of April, 1918.

HERBERT N. WAYNE.

Witness:
VIRGINIA F. BERINGER.